(12) United States Patent
Komatsu et al.

(10) Patent No.: US 10,260,899 B2
(45) Date of Patent: Apr. 16, 2019

(54) NAVIGATION SYSTEM AND BYPASS ROUTE SETTING METHOD

(71) Applicant: ALPINE ELECTRONICS, INC., Shinagawa-ku, Tokyo (JP)

(72) Inventors: Michihisa Komatsu, Iwaki (JP); Kohei Otsuki, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 0 days.

(21) Appl. No.: 14/881,269

(22) Filed: Oct. 13, 2015

(65) Prior Publication Data

US 2016/0138929 A1 May 19, 2016

(30) Foreign Application Priority Data

Nov. 17, 2014 (JP) .................................. 2014-232339

(51) Int. Cl.
*G01C 21/34* (2006.01)
*G01C 21/36* (2006.01)

(52) U.S. Cl.
CPC ..... *G01C 21/3461* (2013.01); *G01C 21/3415* (2013.01); *G01C 21/3605* (2013.01)

(58) Field of Classification Search
CPC .................. G01C 21/3461; G01C 21/3415
See application file for complete search history.

(56) References Cited

U.S. PATENT DOCUMENTS

| | | | |
|---|---|---|---|
| 8,775,069 B1 | 7/2014 | Kabel et al. | |
| 2003/0023375 A1* | 1/2003 | Yoshida | G01C 21/3461 701/455 |
| 2003/0060974 A1 | 3/2003 | Miyahara et al. | |
| 2007/0239354 A1 | 10/2007 | Kwon | |
| 2008/0082253 A1* | 4/2008 | Oguchi | G01C 21/3461 701/533 |

(Continued)

FOREIGN PATENT DOCUMENTS

| | | |
|---|---|---|
| JP | 08-128845 | 5/1996 |
| JP | H08-122088 | 5/1996 |

(Continued)

OTHER PUBLICATIONS

Japanese Office Action with English translation for Patent Application No. 2014-232339, dated Apr. 17, 2018, 12 pgs.

(Continued)

*Primary Examiner* — Jess Whittington
(74) *Attorney, Agent, or Firm* — Brinks Gilson & Lione

(57) ABSTRACT

A navigation device includes: a search request transmitting unit to transmit a route search request including an avoidance range specified by using longitude and latitude; and a search result receiving unit to receive route information transmitted in response to the route search request. A route providing device includes a search request receiving unit to receive the route search request transmitted from the navigation device; an avoidance road identifying unit to identify a road corresponding to the avoidance range included in the route search request; a route search processing unit to determine an optimal route to reach a destination by bypassing the road corresponding to the avoidance range; and a search result transmitting unit to transmit, to the navigation device, the route information indicating the determined route.

19 Claims, 8 Drawing Sheets

(56) References Cited

U.S. PATENT DOCUMENTS

2011/0172903 A1* 7/2011 Farr .................. G01C 21/3461
                                                              701/533

FOREIGN PATENT DOCUMENTS

| JP | H08-128845 | 5/1996 |
| --- | --- | --- |
| JP | 09-280882 | 10/1997 |
| JP | H09-280882 | 10/1997 |
| JP | 11-083519 | 3/1999 |
| JP | H11-083519 | 3/1999 |
| JP | 11-304516 | 11/1999 |
| JP | H11-304516 | 11/1999 |
| JP | 2001-330456 | 11/2001 |
| JP | 2002-243480 | 8/2002 |
| JP | 2003-75178 | 3/2003 |
| JP | 2004-061429 | 2/2004 |
| JP | 2007-047148 | 2/2007 |
| JP | 2008-157737 | 7/2008 |

OTHER PUBLICATIONS

Office Action for JP2014-232339 dated Oct. 26, 2018, 6 pgs. Including English translation.

* cited by examiner

NAVIGATION SYSTEM AND BYPASS ROUTE SETTING METHOD

RELATED APPLICATION

The present application claims priority to Japanese Patent Application Number 2014-232339, filed Nov. 17, 2014, the entirety of which is hereby incorporated by reference.

BACKGROUND

1. Field of the Invention

The present invention relates a navigation system and a bypass route setting method to set a bypass route relative to a travel route ahead of a vehicle while the vehicle is traveling along a travel route set by route search processing.

2. Description of the Related Art

In the related art, there is a known communication navigation system in which a route search request is transmitted to a map information providing communication center device from a communication navigation terminal, and the map information providing communication center device conducts a search for an optimal route and returns a result thereof to the communication navigation terminal (refer to JP 2003-75178 A, for example).

Further, in the related art, there is a known configuration in which a route to bypass a congested road is returned to a vehicle which has transmitted a current position and a destination to a road information center (refer to JP 2004-61429 A, for example).

According to the configuration disclosed in JP 2003-75178 A, route search processing is performed on a center side (external device) in response to a route search request transmitted from a vehicle side, and an optimal travel route obtained as a result thereof is returned to the vehicle side. This point is the same as the configuration disclosed in JP 2004-61429 A. According to the configurations disclosed in JP 2003-75178 A and JP 2004-61429 A, the optimal travel route obtained as the result of the route search processing performed on the center side can be acquired. However, in the case where traffic congestion, various kinds of traveling regulations, and the like take place in a travel route ahead while the vehicle travels along the mentioned optimal travel route, there is a problem in which the travel route cannot be reset by specifying a road to be avoided. For example, it may be possible to designate a link number and a node number of the road to be avoided on the vehicle side, but map data used in the vehicle is not always the same as map data used on the center side. Therefore, the same road may not be specified even though the link number and the node number are designated, and a place of the road to be avoided may not be found by the center side.

SUMMARY

The present disclosure has been made in the view of the above-described points, and is directed to providing a navigation system and a bypass route setting method which enables an external device to set a travel route to a destination by specifying a road to be avoided ahead.

To solve the above-described problems, a navigation system according to the present disclosure includes a route providing device and a navigation device. The navigation device includes: a route search request transmitting unit configured to transmit, to the route providing device, a route search request including a destination and an avoidance range specified by using longitude and latitude; and a search result receiving unit configured to receive route information which is transmitted from the route providing device in response to the route search request and indicates an optimal route to reach the destination by bypassing the avoidance range. Further, the route providing device includes: a search request receiving unit configured to receive the route search request transmitted from the navigation device; an avoidance road identifying unit configured to identify a road corresponding to the avoidance range included in the route search request; a route searching unit configured to perform route search processing to determine an optimal route to reach the destination by bypassing the road corresponding to the avoidance range; and a search result transmitting unit configured to transmit, to the navigation device, the route information indicating a route determined by the route searching unit.

Additionally, a bypass route setting method according to the present disclosure is a bypass route setting method to set a bypass route by a navigation system including a route providing device and a navigation device. The method includes: transmitting, by a route search request transmitting unit of the navigation device, a route search request including a destination and an avoidance range specified by using longitude and latitude to the route providing device; receiving, by a search request receiving unit of the route providing device, the route search request transmitted from the navigation device; identifying, by an avoidance road identifying unit of the route providing device, a road corresponding to the avoidance range included in the route search request; performing route search processing, by a route searching unit of the route providing device, to determine an optimal route to reach the destination by bypassing the road corresponding to the avoidance range; transmitting, by a search result transmitting unit of the route providing device, route information indicating a route determined by the route searching unit to the navigation device; and receiving, by a search result receiving unit of the navigation device, route information which is transmitted from the route providing device in response to the route search request and indicates an optimal route to reach the destination by bypassing the avoidance range.

By specifying the avoidance range by using the longitude and the latitude which do not depend on a version and a type of using map data, the route providing device as an external device can identify the road included in the avoidance range, and a travel route up to the destination by bypassing the avoidance range can be set.

Further, preferably, the above-described avoidance range is an avoidance road, and includes longitude and latitude at a plurality of points included in the avoidance road. By specifying the plurality of points of the avoidance road, the road to be surely avoided can be identified on the route providing device side. Particularly, preferably, a road attribute indicating a type of a road corresponding to the avoidance road is further included in the avoidance road. By specifying the road attribute, the road to be surely avoided can be identified even in the case where a plurality of roads having different road attributes (for example, expressway and general road) are aligned in parallel or vertically.

Further, preferably, the above-described avoidance range includes longitude and latitude at respective apexes of a rectangular range surrounding an area corresponding to the avoidance range. The road to be surely avoided inside the area can be identified on the route providing device side by specifying the respective apexes of the rectangular range surrounding the area corresponding to the avoidance range. Further, preferably, a road attribute indicating a type of a road corresponding to the avoidance range is included in the avoidance range. By specifying the road attribute, the road to be more surely avoided can be identified even in the case where a plurality of roads having different road attributes are included in the rectangular range.

Further, preferably, the above-described avoidance range is an avoidance road, and includes longitude and latitude included in the avoidance road, and a distance of the avoidance road. By specifying the distance together with the longitude and the latitude, the road to be surely avoided can be identified on the route providing device side. Further, preferably, a road attribute indicating a type of a road corresponding to the avoidance road is further included in the avoidance road. By specifying the road attribute, the road to be more surely avoided can be identified even in the case where a plurality of roads having different road attributes are aligned in parallel.

Further, preferably, the above-described route searching unit performs the route search processing by increasing a cost for the avoidance range. By this, the route to bypass the road corresponding to the avoidance range can be easily and surely set.

Further, preferably, the above-described search result transmitting unit transmits the route information including the longitude and the latitude at the plurality of points included in the route determined by the route searching unit. This enables the navigation device side to surely identify the route provided from the route providing device.

Additionally, preferably, the above-described navigation device further includes a route guide unit configured to guide movement to the destination based on the route information received by the search result receiving unit. By this, movement to the destination along the route provided from the route providing device can be guided.

Further, preferably, the above-described navigation device is mounted on a vehicle, and the route providing device is disposed outside the vehicle and connected to the navigation device via a predetermined network. With this configuration, when traffic congestion or road regulation takes place ahead of the vehicle, a route to bypass such a point can be obtained from the route providing device.

DETAILED DESCRIPTION

In the following, an embodiment of a navigation system according to the present disclosure will be described with reference to the drawings.

Figure 1:
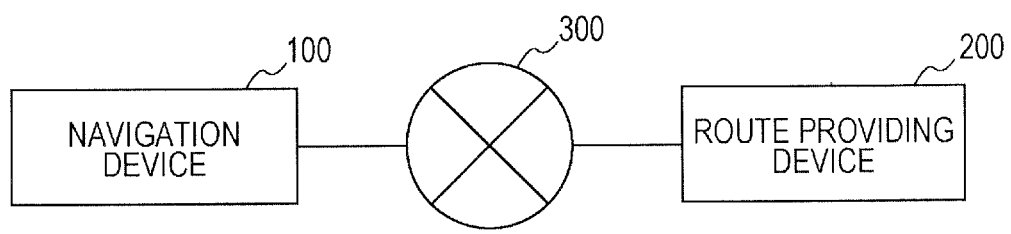
FIG. 1 is a diagram illustrating a general configuration of a navigation system according to an embodiment.

FIG. 1 is a diagram illustrating a general configuration of a navigation system according to an embodiment. The navigation system illustrated in FIG. 1 is formed by including a navigation device 100 mounted on each vehicle, and a route providing device 200 that performs route search processing in response to a route search request transmitted from the navigation device 100, and returns a result thereof. The navigation device 100 is connected to the route providing device 200 via a predetermined network 300. Further, the network 300 in the present embodiment may be formed by including various kinds of networks such as a mobile phone network and the Internet.

Figure 2:
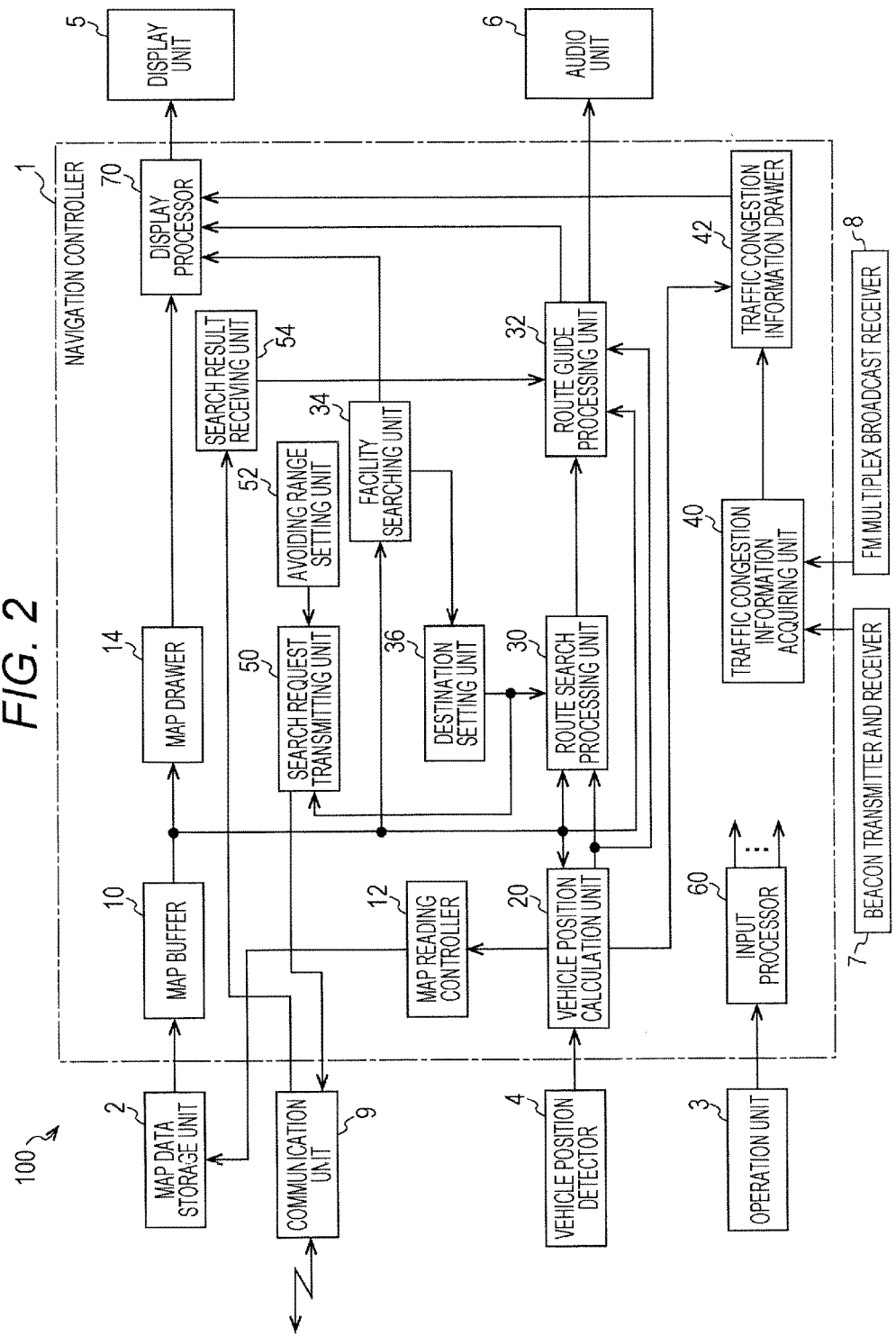
FIG. 2 is a diagram illustrating a detailed configuration of a navigation device.

Next, a detailed configuration of the navigation device 100 will be described. FIG. 2 is a diagram illustrating the detailed configuration of the navigation device 100. As illustrated in FIG. 2, the navigation device 100 is formed by including a navigation controller 1, a map data storage unit 2, an operation unit 3, a vehicle position detector 4, a display unit 5, an audio unit 6, a beacon transmitter and receiver 7, an FM multiplex broadcast receiver 8, and a communication unit 9. The navigation device is mounted in a vehicle.

The navigation controller 1 executes a predetermined operation program by using a CPU, a ROM, a RAM, etc., thereby achieving various kinds of functions such as a map image displaying operation for the vicinity of the user's vehicle position, a route guide operation by performing route search processing to set a travel route connecting a start point to a destination, and guide a vehicle to travel along the travel route, a receiving operation relative to traffic congestion information transmitted from the VICS (registered trademark), and a receiving and transmitting operation for a route search request and a search result with respect to the route providing device 200. A detailed configuration of the navigation controller 1 will be described later.

The map data storage unit 2 is a storage medium that stores map data needed for map displaying, facility searching, route searching, etc. and also is a reading unit therefor. The map data storage unit 2 stores the map data formed of units of rectangular map sheets sectioned in appropriate sizes by longitude and latitude. The map data of each map sheet can be identified and read out by specifying a map sheet number. The map data storage unit 2 is implemented by a hard disk device, a semiconductor memory, or a DVD and a reading device thereof. Further, the map data may be also obtained from an external map distribution server (not illustrated) by replacing the map data storage unit 2 with the communication unit 9.

The operation unit 3 receives a user's command (operation), and includes various kinds of operation buttons and operation knobs. Further, the operation unit 3 includes a touch panel mounted on a screen of the display unit 5, and the operational command can be provided by the user directly touching on a part on the screen with a finger or the like. The vehicle position detector 4 includes, for example, a GPS receiver, a direction sensor, a range sensor, etc. and detects a vehicle position (longitude and latitude) at a predetermined timing, and outputs a detection result.

The display unit 5 is formed of, for example, a liquid crystal display (LCD) and displays a map image of the vicinity of the user's vehicle position based on a video signal output from the navigation controller 1. The audio unit 6 outputs a guide voice and the like to a vehicle interior based on an audio signal received from the navigation controller 1.

The beacon transmitter and receiver 7 performs bidirectional communication with a radio beacon mainly set in an expressway via radio waves, and further receives the traffic congestion information transmitted from the VICS center by performing bidirectional communication with an optical beacon transmitter and receiver mainly set in a general road. The FM multiplex broadcast receiver 8 receives the traffic congestion information included in multiplex data superimposed on general FM broadcast. The traffic congestion information received by the beacon transmitter and receiver 7 and the FM multiplex broadcast receiver 8 includes traffic congestion levels (light congestion and heavy congestion), information related to a change point of a traffic amount on a road (start point of traffic congestion, and a distance of a section of heavy congestion/light congestion).

The communication unit 9 performs data communication with the external route providing device 200. In most general cases, a mobile phone or a mobile terminal device is used as the communication unit 9, but a short-range communication module, a radio LAN module, or the like may also be used as the communication unit 9.

Next, the detailed configuration of the navigation controller 1 will be described. The navigation controller 1 illustrated in FIG. 1 is formed by including a map buffer 10, a map reading controller 12, a map drawing unit 14, a vehicle position calculation unit 20, a route search processing unit 30, a route guide processing unit 32, a facility searching unit 34, a destination setting unit 36, a traffic congestion information acquiring unit 40, a traffic congestion information drawing unit 42, a search request transmitting unit 50, an avoidance range setting unit 52, a search result receiving unit 54, an input processor 60, and a display processor 70.

The map buffer 10 temporarily stores map data read from the map data storage unit 2. The map data includes at least data needed for map image drawing, data needed for searching a facility by designating a search condition, and data needed for route searching and route guiding. The map reading controller 12 outputs, to the map data storage unit 2, a request for reading map data for a predetermined range in accordance with a vehicle position calculated by the vehicle position calculation unit 20 and a position specified by the user's operation at the operation unit 3. The map drawing unit 14 creates map image drawing data by performing the necessary drawing processing in order to display a map image on the display unit 5 based on the map data stored in the map buffer 10.

The vehicle position calculation unit 20 calculates a user's vehicle position based on detected data output from the vehicle position detector 4, and further executes map matching processing to correct the user's vehicle position in the case where the calculated user's vehicle position is not on a road of the map data.

The route search processing unit 30 conducts a search for a least cost travel route (guide route) between a start point and a destination (or via point) in accordance with a predetermined search condition. Further, the route search processing unit 30 searches a lower cost bypass route while the vehicle travels along the travel route (guide route) obtained by the mentioned search.

The route guide processing unit 32 displays a guide route obtained by the search processing by the route search processing unit 30 superimposed on the map, creates guide route drawing data to display an enlarged view of an intersection to make a right turn or a left turn, and generates an audio signal such as intersection guide needed for guiding travel of the vehicle along the guide route (route guide operation).

The facility searching unit 34 conducts a search for a facility that satisfies the search condition set by using the operation unit 3. For example, there may be a case of narrowing a candidate facility by designating a facility genre as the search condition, or a case of narrowing down a facility by specifying a phone number, an address, and so on.

The destination setting unit 36 sets a destination needed for the route search processing and the like performed by the route search processing unit 30. For example, there may be a case of setting, as the destination, a facility extracted by the search executed by the facility searching unit 34, a case of setting, as the destination, a place on the map directly designated by the user's operation at the operation unit 3, and so on.

The traffic congestion information acquiring unit 40 performs acquiring processing for the traffic congestion information transmitted from the VICS center and received by the beacon transmitter and receiver 7 and the FM multiplex broadcast receiver 8. Note that the traffic congestion information may be also acquired from an external traffic congestion information distribution center (name of the center is not limited thereto) other than the VICS center. The traffic congestion information drawing unit 42 performs drawing processing to create traffic congestion drawing data corresponding to the traffic congestion information acquired by the traffic congestion information acquiring unit 40, for example, the processing to draw an arrow image as an auxiliary image having a color corresponding to a level of traffic congestion (heavy congestion, light congestion, or smooth) regarding a section specified by the traffic congestion information.

The input processor 60 outputs, to respective units inside the navigation controller 1, a command to perform an operation corresponding to various kinds of operational commands input from the operation unit 3.

The display processor 70 receives the map image drawing data created by the map drawing unit 14, and displays a map image of a predetermined range on the screen of the display unit 5 based on the drawing data. Further, when the travel route set by the route search processing unit 30, the facility obtained by the search executed by the facility searching unit 34, and the drawing data representing the auxiliary image drawn by the traffic congestion information drawing unit 42 are received, the display processor 70 displays, on the screen of the display unit 5, the drawing data superimposed on the map image.

Meanwhile, the navigation device 100 according to the present embodiment is capable of alone performing the route search processing and bypass route search processing by using the route search processing unit 30 included in the device, but also capable of requesting the external route providing device 200 to perform the mentioned processing to acquire a result of the processing, and performing a route guide operation thereafter. For this, the search request transmitting unit 50, avoidance range setting unit 52, and search result receiving unit 54 are provided.

The search request transmitting unit 50 transmits, to the route providing device 200, a route search request including a destination, a search condition, an avoidance range (in the case of requesting search for a bypass route), etc. via the communication unit 9.

Figure 3:
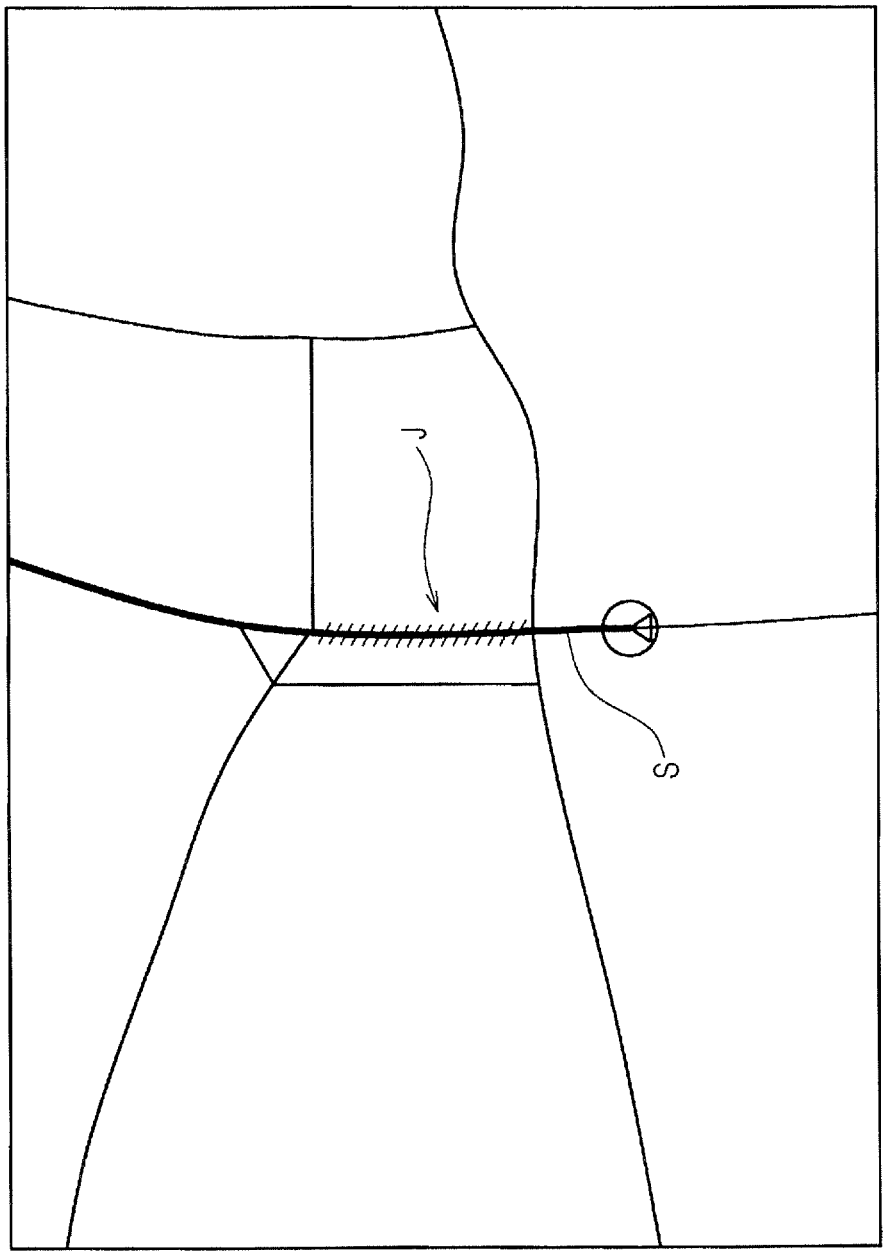
FIG. 3 is an explanatory diagram illustrating an avoidance range ahead of a vehicle.

The avoidance range setting unit 52 sets an avoidance range ahead of the vehicle in the case of requesting a search for a bypass route. FIG. 3 is an explanatory diagram illustrating the avoidance range ahead of a vehicle. In FIG. 3, S indicates a travel route set by a route search and currently being guided, and J indicates a section of traffic congestion respectively. When the section of traffic congestion thus exists ahead of the vehicle, there may be used the following two methods as a method to set a section of traffic congestion as an avoidance range (avoidance road).

Figure 4:
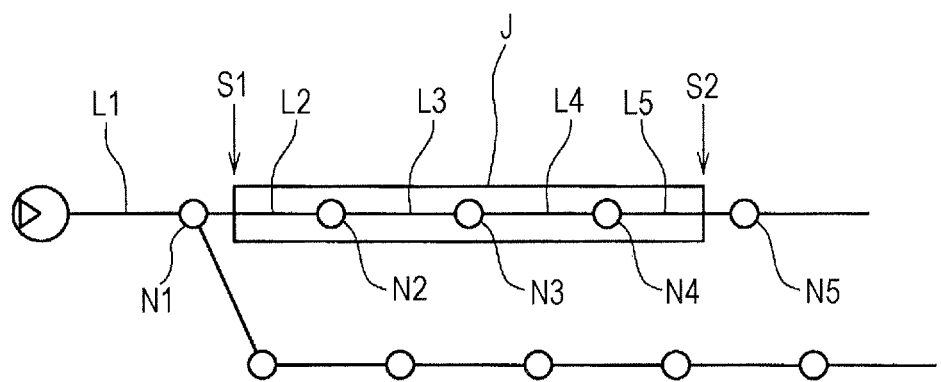
FIG. 4 is a diagram illustrating a specific example of setting an avoidance range by specifying a sequence of longitude and latitude at a plurality of points.

(1) Specify longitude and latitude at a plurality of points (sequence of longitude and latitude) included in the avoidance range (section of traffic congestion). FIG. 4 is a diagram illustrating a specific example of setting the avoidance range by specifying the sequence of longitude and latitude at the plurality of points. In FIG. 4, L1, L2, etc. indicate link numbers corresponding to roads ahead of the vehicle, N1, N2, etc. indicate node numbers corresponding to the roads ahead of the vehicle, and J indicates the avoidance section, respectively. For example, the avoidance range is specified by the user's touching a head position S1 and a tail position S2 of the avoidance section J by using the operation unit 3 (one or plural intermediate points may be added, too). The avoidance range setting unit 52 extracts the respective links included in the avoidance range, and sets, as the information to specify the avoidance range, the sequence of longitude and latitude corresponding to the plurality of nodes including both end nodes N1 and N5 of the plurality of links. Meanwhile, preferably, the information to specify the avoidance range includes a road attribute together with the sequence of longitude and latitude. The road attribute indicates a type of a road, such as an expressway, a toll road, a national road, and a prefectural road, but road categories may be more simply specified, such as "expressway and toll road" and "other roads".

Figure 5:
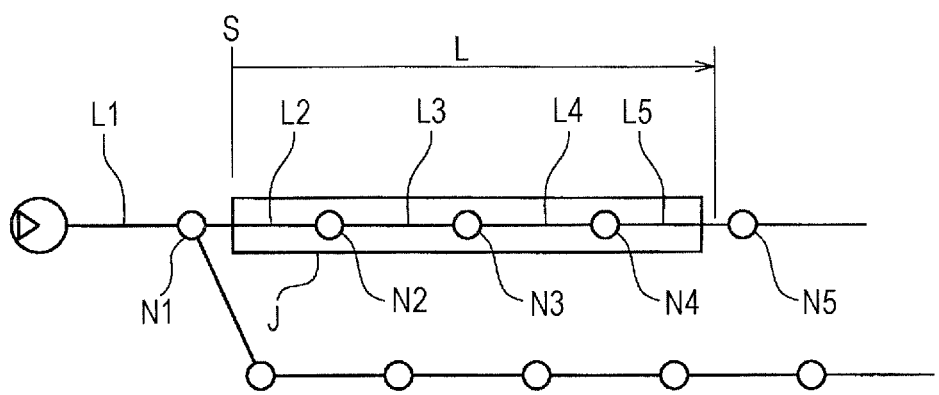
FIG. 5 is a diagram illustrating a specific example of setting an avoidance range by specifying longitude, latitude, and a distance of a specific point.

(2) Specify longitude and latitude of a specific point (preferably, head position) included in the avoidance range (section of traffic congestion) and a rough distance of the avoidance range. FIG. 5 is a diagram illustrating a specific example of setting the avoidance range by specifying the longitude, latitude, and distance of the specific point. The avoidance range is specified by the user's touching the head position S and a distance L of the avoidance section J by using the operation unit 3. The avoidance range setting unit 52 extracts the respective links included in the avoidance range, and sets, as information to specify the avoidance range, the longitude and the latitude of the head node N1 of the plurality of links and the distance L thereof. Meanwhile, preferably, the information to specify the avoidance range includes a road attribute in addition to the above information.

The search result receiving unit 54 receives a search result returned from the route providing device 200 in response to the route search request. The search result includes the information to specify the travel route from a current position of the user's vehicle to the destination. For example, as the information to specify the travel route, the sequence of longitude and latitude of the respective nodes (not necessarily all of the nodes but a part of the nodes needed for specifying the travel route) included in the travel route, and a simple image and audio data to indicate a direction of right turn or left turn at the intersection, and so on are used. Based on such information, the route guide processing unit 32 displays the guide route superimposed on the map, creates the drawing data to display a simple guide view of the intersection to make a right turn or a left turn (an arrow to indicate right turn or left turn, for example), and further generates an audio signal to inform the direction of right turn or left turn (route guide operation).

Figure 6:
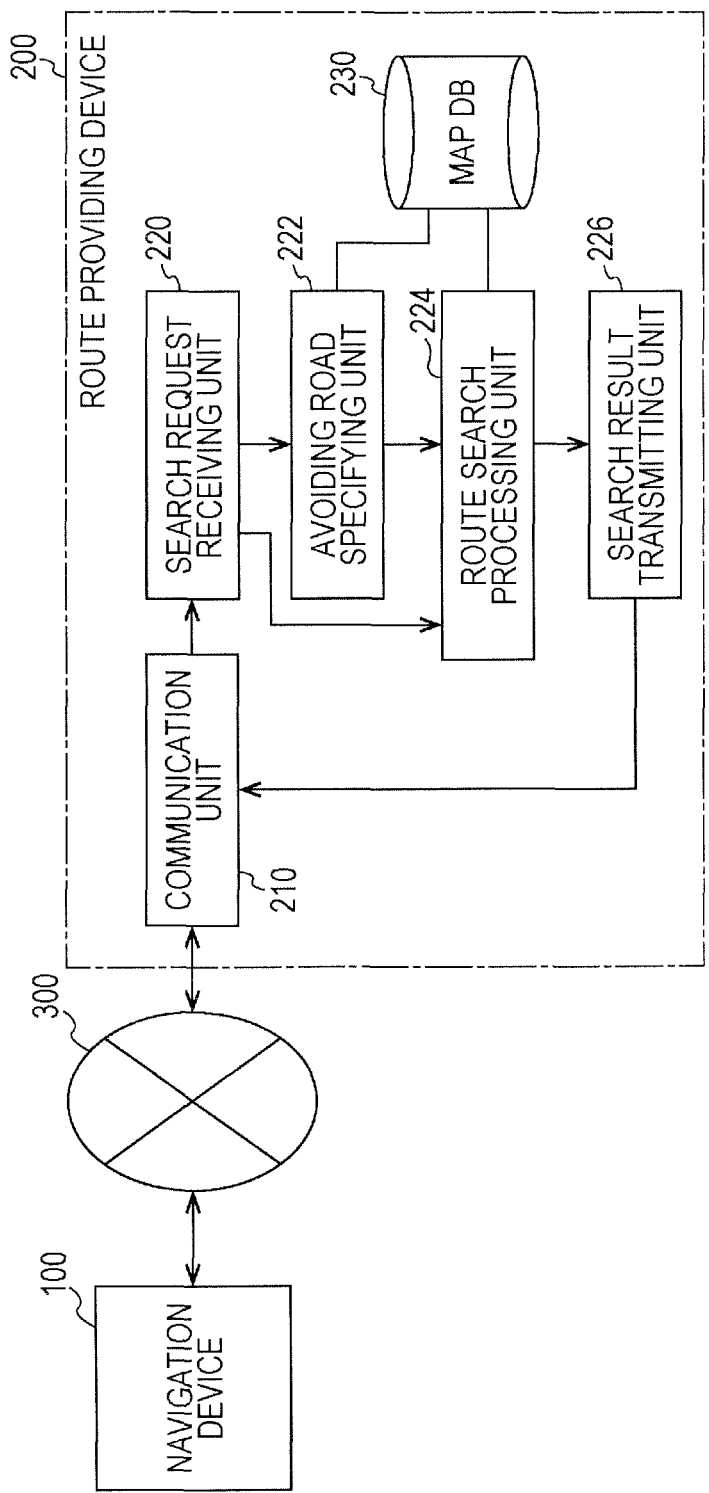
FIG. 6 is a diagram illustrating a detailed configuration of a route providing device.

Next, the detailed configuration of the route providing device 200 will be described. FIG. 6 is a diagram illustrating the detailed configuration of the route providing device 200. As illustrated in FIG. 6, the route providing device 200 is formed by including a communication unit 210, a search request receiving unit 220, an avoidance road identifying unit 222, a route search processing unit 224, a search result transmitting unit 226, and a map database (DB) 230. The route providing device 200 includes a configuration as a computer, and performs various kinds of operation by executing a predetermined operation program by using a CPU, a ROM, a RAM, and so on.

The communication unit 210 performs, via the network 300, data communication with the navigation device 100 mounted on each vehicle. The search request receiving unit 220 receives a route search request transmitted from the navigation device 100.

The avoidance road identifying unit 222 identifies a road corresponding to the avoidance range included in the route search request received by the search request receiving unit 220. As described above, the avoidance range includes the sequence of longitude and latitude and a distance along the road corresponding to the avoidance range, and the avoidance road identifying unit 222 can identify the road corresponding to the avoidance range based on the information. Meanwhile, in the case where a road attribute is included in the route search request, the road corresponding to the avoidance range is preferably identified considering the road attribute.

The route search processing unit 224 performs the route search processing, and determines an optimal route to reach the destination by bypassing the road corresponding to the avoidance range (more specifically, by increasing a cost at the time of route search corresponding to this road). The search result transmitting unit 226 transmits, to the navigation device 100, route information indicating the route determined by the route search processing unit 224 (for example, a sequence of longitude and latitude coordinates corresponding to the route). The map database (DB) 230 stores map data needed for identifying processing executed by the avoidance road identifying unit 222 for the road corresponding to the avoidance range, and the route search processing executed by the route search processing unit 224. The map data are constantly updated to the latest one.

The above-described search request transmitting unit 50 corresponds to a search request transmitting means, the search result receiving unit 54 corresponds to a search result receiving means, and the route guide processing unit 32 corresponds to a route guide processing means respectively. Further, the above-described search request receiving unit 220 corresponds to a search request receiving means, the avoidance road identifying unit 222 corresponds to an avoidance road identifying means, the route search processing unit 224 to a route searching means, and the search result transmitting unit 226 to a search result transmitting means, respectively.

The navigation system according to the present embodiment includes the above configuration, and now, operation of bypass search (forward search) performed on the vehicle side by setting the avoidance range ahead of the vehicle during route guidance will be described.

Figure 7:
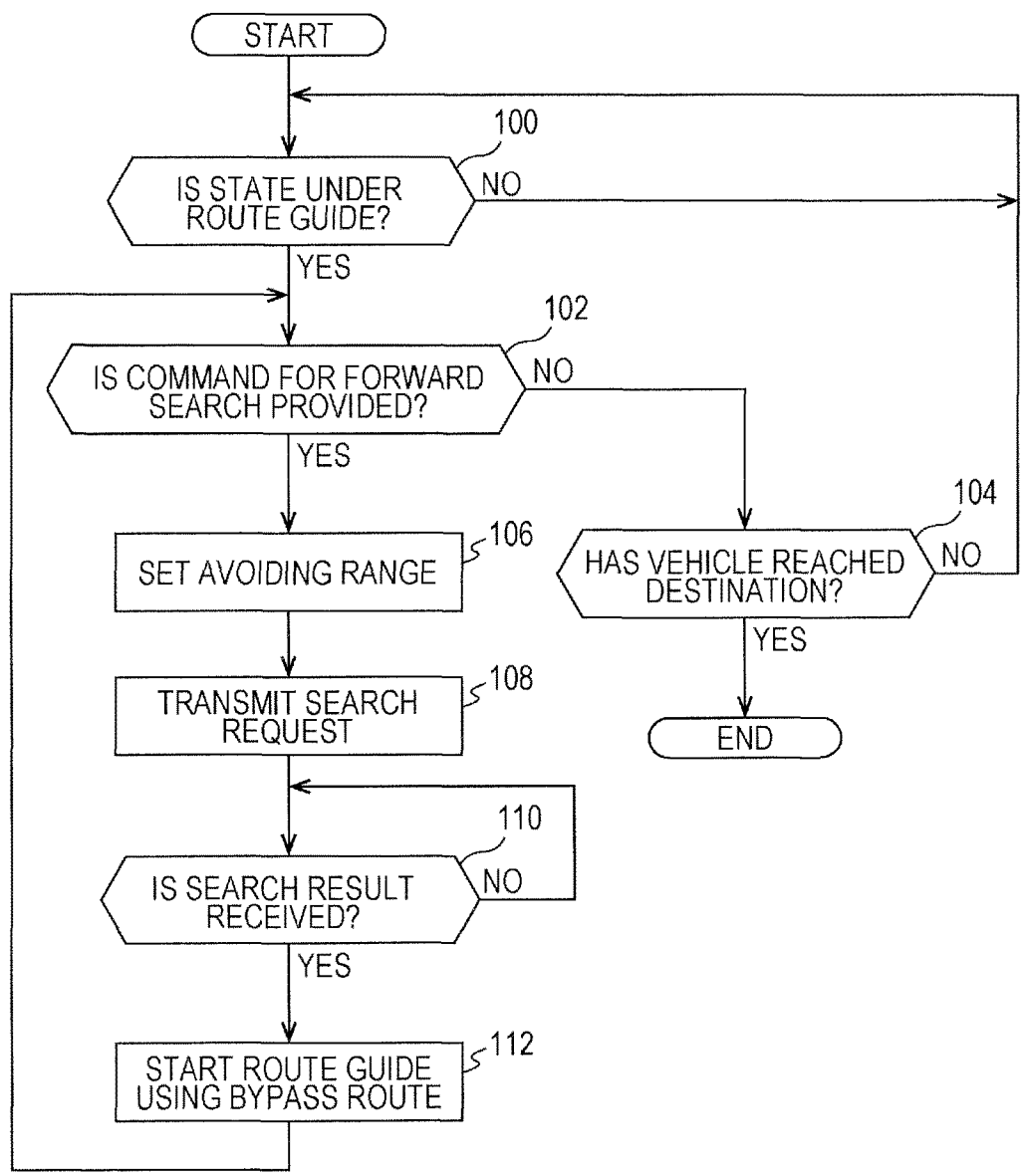
FIG. 7 is a flowchart illustrating an operating procedure in the navigation device.

FIG. 7 is a flowchart illustrating an operating procedure in the navigation device 100. Note that the operating procedure illustrated in FIG. 7 focuses on operation related to the forward search, and other operations are omitted.

The avoidance range setting unit 52 determines whether route guidance is currently executed (Step 100). The route guidance may be either the case where a travel route set by route searching of the navigation device 100 is used or the case where a travel route obtained by making a route search request to the route providing device 200 and receiving a result thereof is used. In the case where route guidance is not currently executed, a negative determination is made and the determination is repeated again.

Further, in the case where route guidance is currently executed, a positive determination is made in the determination in Step 100. Next, the avoidance range setting unit 52 determines whether a command for forward search is provided by a user (Step 102). In the case where the command for forward search is not provided, a negative determination is made. In this case, the avoidance range setting unit 52 determines whether a vehicle has reached a destination (Step 104). In the case where the vehicle has not reached the destination, a negative determination is made, and the determination on whether route guidance is currently executed is repeated returning to Step 100. Further, in the case where the vehicle has reached the destination, a positive determination is made in Step 104, and the processing related to the forward search ends.

On the other hand, when the command for forward search is provided by the user, a positive determination is made in Step 102. Next, the avoidance range setting unit 52 sets an avoidance range to be bypassed (Step 106). As described above, the avoidance range is specified not by designating a node and a link but by designating a sequence of longitude and latitude coordinates or designating longitude and latitude coordinates combined with a distance. Next, the search request transmitting unit 50 transmits, to the route providing device 200, a route search request including the destination, search condition, avoidance range, and so on (Step 108).

Next, the search result receiving unit 54 determines whether a search result to be returned from the route providing device 200 is received (Step 110). In the case of not being received, the determination is repeated. Further, when the search result is received, a positive determination is made in Step 110. The route guide processing unit 32 starts route guidance by using the received search result, namely, starts an operation to guide travel of the vehicle up to the destination while bypassing the avoidance range (Step 112). After that, the processing returns to Step 102, and the determination is made on whether the command for forward search is provided.

Figure 8:
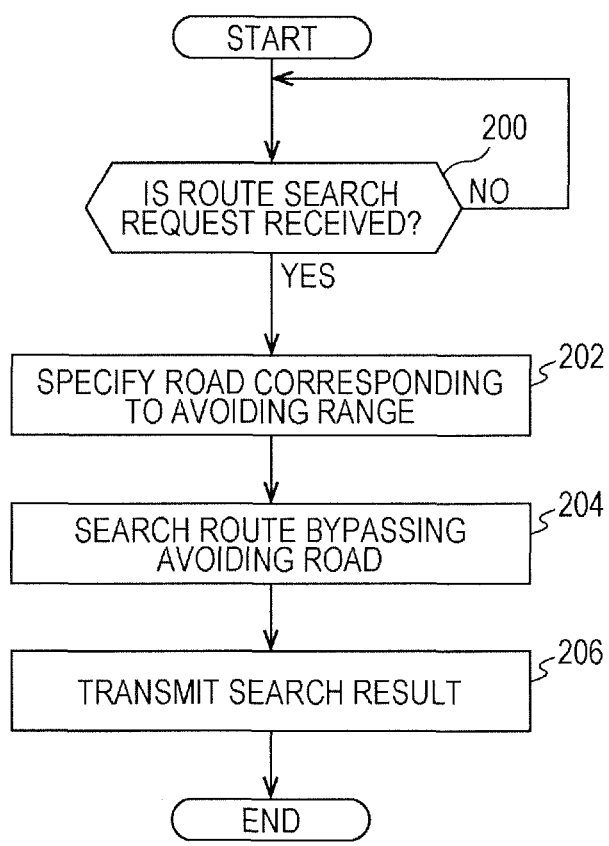
FIG. 8 is a flowchart illustrating an operating procedure in the route providing device.

FIG. 8 is a flowchart illustrating an operating procedure in the route providing device 200. The operating procedure illustrated in FIG. 8 focuses on operation in the case where the route search request for forward search is made from the navigation device 100, and other operations are omitted.

The search request receiving unit 220 determines whether the route search request transmitted from the navigation device 100 is received (Step 200). In the case of not being received, the determination is repeated. Further, when the route search request is received, a positive determination is made in Step 200.

Next, the avoidance road identifying unit 222 identifies a road corresponding to the avoidance range (avoidance road) (Step 202). Further, the route search processing unit 224 performs the route search processing, and determines an optimal route to reach the destination by bypassing the identified avoidance road (Step 204). The search result transmitting unit 226 transmits the determined route to the navigation device 100 (Step 206). In this manner, a series of processing steps corresponding to the forward search executed by the route providing device 200 ends.

As described above, in the navigation system according to the present embodiment, the road included in the avoidance range can be identified in the route providing device by specifying the avoidance range by using the longitude and the latitude which do not depend on a version and a type of using map data, and the travel route up to the destination by bypassing the avoidance range can be set.

Particularly, by specifying a plurality of points of the avoidance range, the road to be surely avoided can be identified on the route providing device side. Moreover, by further specifying a road attribute, the road to be surely avoided can be identified even in the case where a plurality of roads having different road attributes (for example, expressway and general road) are aligned in parallel or vertically.

Alternatively, the road to be surely avoided can be identified on the route providing device side by specifying the distance together with the longitude and the latitude. Further, in this case also, the road to be surely avoided can be identified by further specifying a road attribute even in the case where a plurality of roads having different road attributes are aligned in parallel.

Further, by performing the route search processing by increasing a cost for the avoidance range, the route to bypass the road corresponding to the avoidance range can be easily and surely set.

The route provided from the route providing device 200 as the search result can be surely identified on the navigation device 100 side by transmitting, from the route providing device 200 to the navigation device 100, the route information including the longitude and the latitude at the plurality of points included in the route determined by the route search processing in the route providing device 200.

Further, movement (travel of vehicle) up to the destination along the route provided from the route providing device 200 can be guided by disposing, in the navigation device 100, the route guide processing unit 32 that guides movement of the vehicle up to the destination based on the route information received by the search result receiving unit 54.

Further, the navigation device 100 is mounted in the vehicle, and the route providing device 200 is disposed outside the vehicle and connected to the navigation device 100 via the predetermined network. When traffic congestion or the like occurs ahead of the vehicle, the route to bypass such a place can be obtained from the route providing device 200.

Meanwhile, the present disclosure is not limited to the above-described embodiment, and various kinds of modifications can be made within the scope of the present disclosure. For example, according to the above-described embodiment, the route to bypass a specific road is obtained from the route providing device 200 by setting the specific road as the avoidance range (avoidance road) as illustrated in FIGS. 4 and 5. However, the avoidance range may be specified by using longitude and latitude of respective apexes of a rectangular range by setting the rectangular range surrounding an area including one or a plurality of roads.

Figure 9:
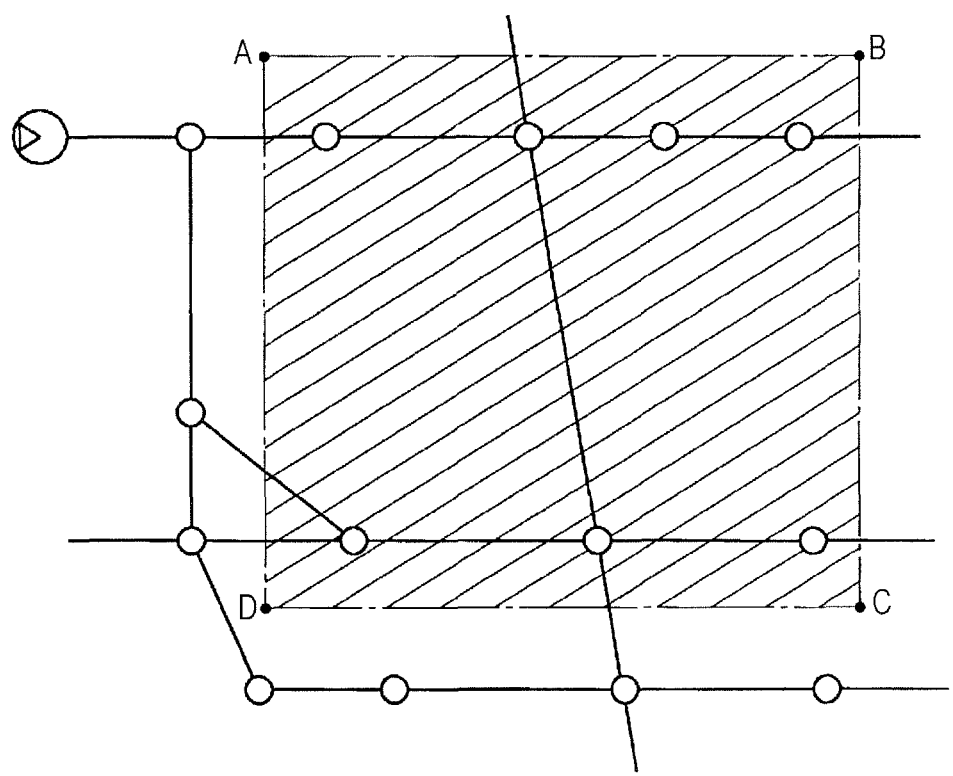
FIG. 9 is a diagram illustrating a specific example of setting an avoidance range by specifying longitude and latitude of respective apexes of a rectangular range.

FIG. 9 is a diagram illustrating a specific example of setting the avoidance range by specifying the longitude and the latitude of the respective apexes of the rectangular range. In FIG. 9, A, B, C, and D indicate four apexes of the rectangular range used for setting the avoidance range. Thus, in the case where there is an area to be bypassed ahead of the vehicle, the rectangular range is set so as to surround the area, and the longitude and the latitude of the respective apexes of the rectangular range are used to specify the avoidance range. Meanwhile, to specify the rectangular range, the four apexes do not always need to be used, and two apexes on a diagonal line may be used as well.

The road to be surely avoided inside the area can be identified on the route providing device 200 by specifying the longitude and the latitude of the respective apexes of the rectangular range surrounding the area corresponding to the avoidance range.

Additionally, by further specifying the road attribute, the road having a road type to be surely avoided can be identified even in the case a plurality of roads having different road attributes (for example, expressway and general road) coexist inside the area.

Further, according to the above-described embodiment, the route search request is transmitted to the route providing device 200 in the case of performing the forward search while route guidance is currently executed on the navigation device 100. However, the route search request may also be transmitted to the route providing device 200 in the case of performing the forward search not while the route guidance is currently performed. For example, when traffic congestion or the like occurs ahead of the vehicle that is freely traveling on a road, the route search request may be transmitted to the route providing device 200 in the case of obtaining a travel route up to a destination by setting a section of traffic congestion as the avoidance section.

As described above, according to the present disclosure, the road included in the avoidance range can be identified in the route providing device by specifying the avoidance range by using the longitude and the latitude which do not depend on the version and the type of using map data, and the travel route up to the destination by bypassing the avoidance range can be set.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. A navigation system comprising a route providing device and a navigation device,
    the navigation device being mounted on a vehicle and including:
        a map data storage unit configured to store map data used by the navigation device;
        an avoidance range setting unit configured to receive an avoidance range ahead of the vehicle on a present travel route and specified by a user via a touch panel on a displayed map image, extract road links included in the avoidance range based on the map data stored in the map data storage unit, and set information to specify the avoidance range comprising longitude and latitude information corresponding to the extracted road links;
        a search request transmitting unit configured to transmit, to the route providing device, a route search request including a destination and the avoidance range set by the avoidance range setting unit using longitude and latitude information corresponding to the extracted road links; and
        a search result receiving unit configured to receive route information which is transmitted from the route providing device in response to the route search request and indicates an optimal route to reach the destination by bypassing the avoidance range, and
    the route providing device being disposed outside of the vehicle and including:
        a map database configured to store map data used by the route providing device;
        a search request receiving unit configured to receive the route search request transmitted from the navigation device;
        an avoidance road identifying unit configured to identify a road defined in the map data stored in the map database corresponding to the avoidance range included in the route search request using the longitude and latitude information;
        a route searching unit configured to perform route search processing to determine an optimal route to reach the destination by bypassing the road corresponding to the avoidance range; and
        a search result transmitting unit configured to transmit, to the navigation device, the route information indicating a route determined by the route searching unit;
    wherein the navigation device on the vehicle and the route providing device outside of the vehicle are each implemented using a computer executing a predetermined program and communicate through a communication network; and
    wherein the avoidance range transmitted by the navigation device to the route providing device is not specified by road node and link data.

2. The navigation system according to claim 1, wherein the avoidance range is an avoidance road, and includes longitude and latitude at a plurality of points included in the avoidance road.

3. The navigation system according to claim 2, wherein the avoidance road includes the longitude and the latitude at the plurality of points included in the avoidance road and a road attribute indicating a type of road corresponding to the avoidance road.

4. The navigation system according to claim 1, wherein the avoidance range includes longitude and latitude at respective apexes of a rectangular range surrounding an area corresponding to the avoidance range.

5. The navigation system according to claim 4, wherein the avoidance range includes the longitude and the latitude at the respective apexes of the rectangular range surrounding the avoidance range, and a road attribute indicating a type of road corresponding to the avoidance range.

6. The navigation system according to claim 1, wherein the avoidance range is an avoidance road, and includes longitude and latitude included in the avoidance road, and a distance of the avoidance road.

7. The navigation system according to claim 6, wherein the avoidance road includes the longitude and the latitude included in the avoidance road, the distance of the avoidance road, and a road attribute indicating a type of road corresponding to the avoidance road.

8. The navigation system according to claim 2, wherein the route searching unit performs route search processing by increasing a cost for the avoidance range.

9. The navigation system according to claim 8,
wherein the search result transmitting unit transmits the route information including longitude and latitude at a plurality of points included in a route determined by the route searching unit.

10. The navigation system according to claim 9,
wherein the navigation device further includes a route guiding unit configured to guide movement to the destination based on the route information received by the search result receiving unit.

11. The method according to claim 1,
wherein the avoidance range is an avoidance road, and includes longitude and latitude included in the avoidance road, and a distance of the avoidance road.

12. The method according to claim 11,
wherein the avoidance road includes the longitude and the latitude included in the avoidance road, the distance of the avoidance road, and a road attribute indicating a type of road corresponding to the avoidance road.

13. A bypass route setting method to set a bypass route by a navigation system including a navigation device mounted on a vehicle and a route providing device disposed outside of the vehicle, the method comprising:

setting, by an avoidance range setting unit of the navigation device, an avoidance range by receiving an avoidance range ahead of the vehicle on a present travel route and specified by a user via a touch panel on a displayed map image, extracting road links included in the avoidance range based on map data stored in a map data storage unit of the navigation device, and setting information to specify the avoidance range comprising longitude and latitude information corresponding to the extracted road links;

transmitting, by a route search request transmitting unit of the navigation device, a route search request including a destination and the avoidance range set by the avoidance range setting unit using longitude and latitude information corresponding to the extracted road links;

receiving, by a search request receiving unit of the route providing device, the route search request transmitted from the navigation device;

identifying, by an avoidance road identifying unit of the route providing device, a road defined in map data stored in a map database of the route providing device and corresponding to the avoidance range included in the route search request using the longitude and latitude information;

performing route search processing, by a route searching unit of the route providing device, to determine an optimal route to reach the destination by bypassing the road corresponding to the avoidance range;

transmitting, by a search result transmitting unit of the route providing device, route information indicating the route determined by the route searching unit to the navigation device; and receiving, by a search result receiving unit of the navigation device, route information which is transmitted from the route providing device in response to the route search request and indicates an optimal route to reach the destination by bypassing the avoidance range;

wherein the navigation device on the vehicle and the route providing device outside of the vehicle are each implemented using a computer executing a predetermined program and communicate through a communication network; and wherein the avoidance range transmitted by the navigation device to the route providing device is not specified by road node and link data.

14. The method according to claim 13,
wherein the avoidance range is an avoidance road, and includes longitude and latitude at a plurality of points included in the avoidance road.

15. The method according to claim 14,
wherein the avoidance road includes the longitude and the latitude at the plurality of points included in the avoidance road and a road attribute indicating a type of road corresponding to the avoidance road.

16. The method according to claim 13,
wherein the avoidance range includes longitude and latitude at respective apexes of a rectangular range surrounding an area corresponding to the avoidance range.

17. The method according to claim 16,
wherein the avoidance range includes the longitude and the latitude at the respective apexes of the rectangular range surrounding the avoidance range, and a road attribute indicating a type of road corresponding to the avoidance range.

18. The method according to claim 13,
wherein the route searching unit performs route search processing by increasing a cost for the avoidance range.

19. The method according to claim 18,
wherein the search result transmitting unit transmits the route information including longitude and latitude at a plurality of points included in a route determined by the route searching unit.

\* \* \* \* \*